Figure 1:
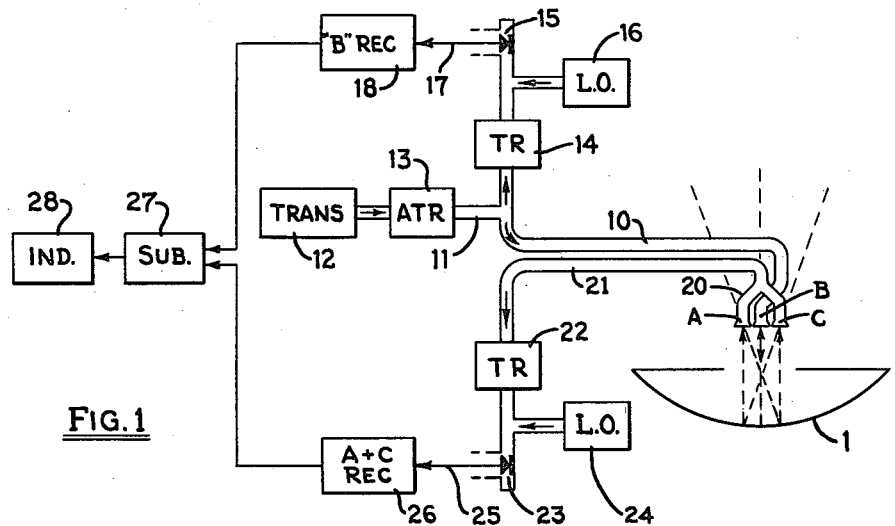

ONE-WAY RADIATING PATTERN OF HORN B ALONE.

ONE-WAY FIELD PATTERNS FOR HORNS A, B, C, RESPECTIVELY SINGLE TARGET

INVENTOR.
ROBERT A. MILAM 3,107,351
RADAR RESOLUTIONS
Robert A. Milam, 3016 N. Arlington,
Indianapolis 18, Ind.
Filed Apr. 29, 1955, Ser. No. 505,076
3 Claims. (Cl. 343—5)
(Granted under Title 35, U.S. Code (1952), sec. 266)

The invention described herein may be manufactured and used by or for the Government of the United States of America for governmental purposes without the payment of any royalties thereon or therefor.

This invention relates to radar and is particularly directed to means for improving the angular resolving power of the system. More particularly, this invention relates to means for enabling the radar to identify accurately the direction to a single target or reflecting object as well as to distinguish between those which are closely spaced.

Heretofore, the most direct approach to increasing radar resolution has involved the reduction of the antenna beamwidth by increasing the antenna size or by increasing the frequency of the microwave energy. Another approach to the problem of increasing angular resolution has involved radiating pulses simultaneously forming two overlapping but slightly diverging directional lobes and then separately receiving signals reflected from a reflecting object intercepted by the overlapping portion of the two lobes, producing a signal representative of the difference between the separately received signals, and then comparing the resultant sum and difference signals to produce an output signal which more accurately represents the angular position of the reflecting object. Heretofore, circuitry for separately receiving and producing the aforesaid sum and difference signals was quite complex.

In accordance with this invention, apparatus for increasing the angular resolution of a radar system may comprise an antenna having a horn for radiating radar signals into space and a reflector for forming the radiated signals into a beam and for collecting radar signal portions which may be returned from reflecting objects intercepted by the beam; means for receiving other portions of signals returned to the said reflector such as two receiving horns disposed on opposite sides of the aforesaid radiating horn in such a manner that the axes of their respective fields-of-directional sensitivity lie in a common plane with the axis of the radar beam and form equal angles of intersection with the beam axis at a common point; and means such as a subtracting circuit for comparing the respective signal portions received by the aforesaid radiating and receiving horns to produce a resultant signal representative of the reflecting objects.

It should be understood that the phrase, axis of directional sensitivity, is intended to represent the axis of the field in space from which radar signal portions of effective magnitude may be reflected to an antenna receiving horn. For convenience, this field is named field of directional sensitivity.

The improved resolution obtainable from a radar system embodying the afore described apparatus is attributable primarily to the fact that the relative magnitude of the respective radar signal portions present at the radiating horn and two receiving horns differ whenever the axis of the single-lobe beam passes through a reflecting object: the magnitude of the signal portions in the receiving horns always will be at a minimum while that at the radiating horn will be at a maximum when this condition exists. When the beam axis moves away from the target and toward one of the axes of directional sensitivity, the magnitude of the respective signal portions at the receiving horns increases while the magnitude of the signal portions at the radiating horn diminishes. Accordingly, a comparison of the relative magnitudes of the aforesaid energy portions in the arithmetic subtractor makes it possible to produce a resultant signal which more accurately represents the direction to the target relative to the instantaneous position of the beam axis.

The object of this invention is to provide apparatus of considerably greater simplicity than that known heretofore for improving the angular resolution of a radar system, especially the resolution of airborne radar systems.

Figure 2:
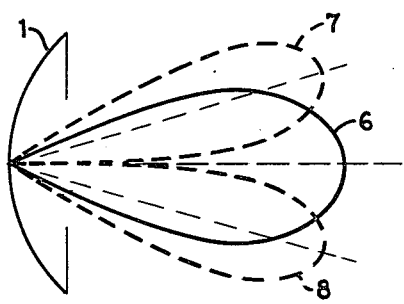
Figure 3:
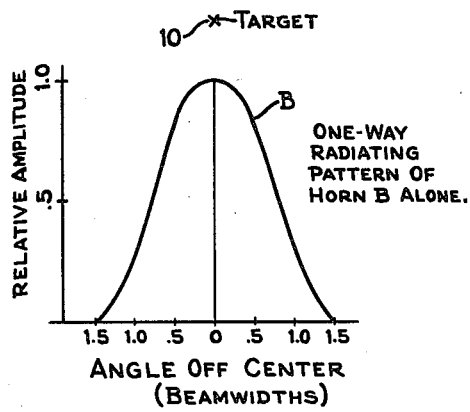

Other objects of this invention will become obvious from the following description of a specific embodiment which is shown in the accompanying drawings wherein:

FIGURE 1 is a block diagram representing a radar system embodying this invention, FIGURE 2 is a diagram representing the configuration of the fields of directional sensitivity for the antenna of FIGURE 1 during intervals when it is receiving radar signal portions returned from reflecting objects, FIGURE 3 is a graph of a transmitted radar signal plotted against radar beam angular orientation, and FIGURES 4, 5, 6, and 7, are graphs of radar signals, both transmitted and received, of the system of FIGURE 1 plotted against radar beam angular orientation.

The antenna system of FIGURE 1 comprises the parabolic reflector 1 and the three antenna horns A, B, and C. The center horn B is aligned on the median centerline, that is, the centroid of the reflector 1 and has a beam pattern of the type shown at 6, FIGURE 2. Horns A and C, utilized only for receiving energy returned from reflecting objects, are placed on either side of horn B and because of their physical displacement from the focal point of the reflector, their respective directional field-of-sensitivity patterns 7 and 8, FIGURE 2, have axes of directional sensitivity which are angularly displaced from the axis of beam 6. Center horn B is coupled to a microwave transmitter, to be hereinafter described, and comprises the sole radiating element of the antenna system. The receiving horns A and C are coupled in parallel to a receiving circuit to be described hereinafter. In addition, center horn B is coupled to a receiver distinct from the receiver of horns A and C.

In operation, a pulse of microwave energy of, say, a fraction of one or two microseconds in length is emitted from the horn B to the reflector 1 and, hence, to any distanct object within the field of beam 6. It is assumed that the microwave pulse terminates, and that the entire antenna system is passive, by the time an echo signal is returned from the distant reflecting object to the reflector 1. Thereupon the portion of the reflected signal portions collected by the reflector 1 rebounds to the horns A, B, and C, thereby illuminating the three horns in various proportions depending upon the angular position of the reflecting target with respect to the centerline of the antenna system and depending upon the location of the three horns with respect to this centerline.

To analyze the echo signals received at the three horns it is expeditious to refer to FIGURES 3, 4, 5, and 6, in which the relative signal amplitudes at the horns have been plotted in rectilinear co-ordinates against the angular position of the antenna off center from the normal median line of the antenna scanning arc. It has been found convenient to designate antenna angular position in terms of beamwidths, one beamwidth being the angular width of the beam at its half-power point. According to FIGURE 3, the illumination intensity at the single target 10 is a maximum when the antenna centerline intersects the target, as may be expected, and the illumination intensity decreases to zero when the beam is displaced about 1.5 beamwidths from the target. Such a beam is normal in modern radar detection and may be of the order of two or three degrees in width at the half-power point.

Figure 4:
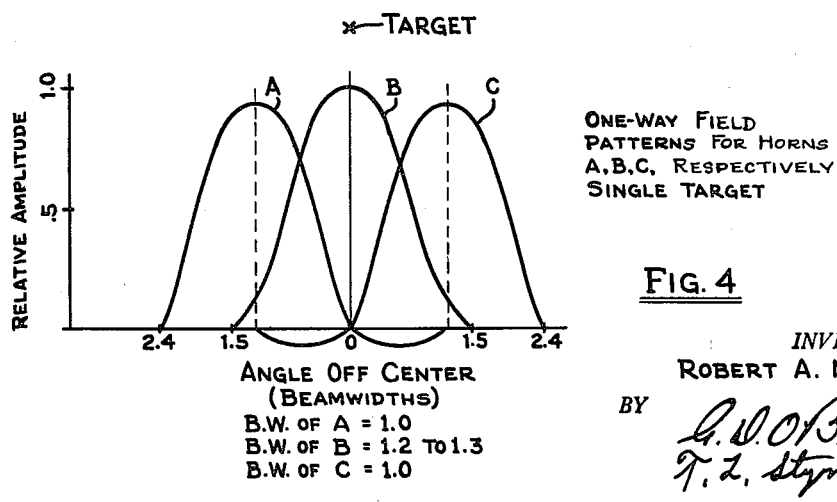

In FIGURE 4, the outline of the field of directional sensitivity for each of the horns A, B, and C, has been plotted in rectangular co-ordinates, the field of directional sensitivity for each of the three horns rising to a maxima at an angular position depending upon the physical displacement of each horn with respect to the reflector centerline. Each plot represents the field intensity at horns A, B, and C, respectively, produced by the echo signal from a single point target. Each intensity is represented independently of interaction between horns. The curves of FIGURE 4, therefore, represent relative amplitude versus angle off center.

Figure 5:
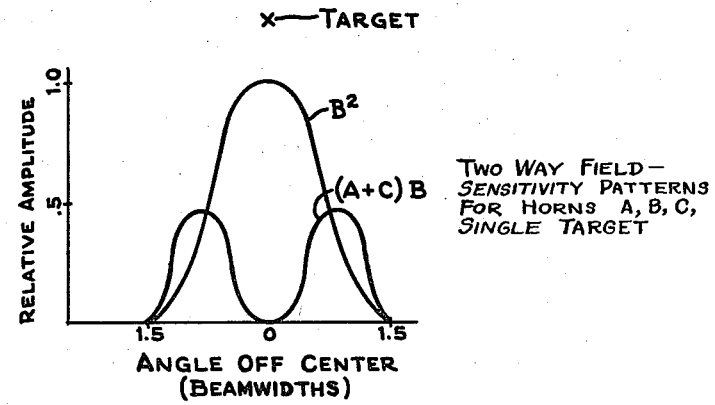

Since the energy radiated from the combination of horn B and reflector 1 is in the form of a highly directive beam, as represented by 6, FIGURE 2, for each transmitted pulse, and since the antenna system has the same directivity for a returning echo signal, the two-way, or round trip directivity of horn B is proportional to the squared value representing the one-way directivity. The relative amplitudes of the respective signal portions received by radiating horn B and receiving horns A and C, respectively, are shown in FIGURE 5. The product of the returned signal received by B and the sum of the two signals received at horns A and C is at a minimum when the antenna is aimed at the target.

Figure 6:
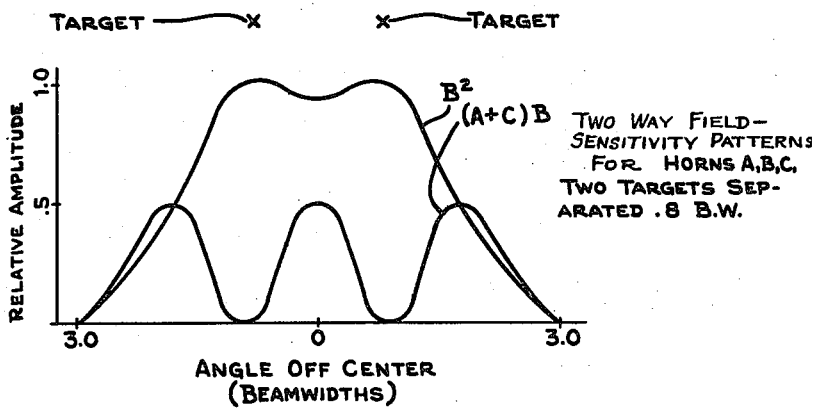

Consider now the operation of the antenna system when two targets are in the antenna field of scan. For simplicity, assume further that the two targets are point sources of reflected energy and that they are identical distances from the antenna so that there is no dissimilarity in phase of the reflected signals. As shown in FIGURE 6, when the two targets are spaced as little as .8 beamwidth apart, the signal received by horn B rises to two maxima as the antenna scans the two targets, whereas the signal intensity midway between the two targets is minimized. Thus according to an important characteristic of this invention, the product of the combined signal, $A+C$, of horns A and C and the signal portion received by horn B has two minima which occur at angles in the antenna scan where the respective targets are intercepted by the axis of the beam radiated from horn B. As will be seen, this is precisely the response characteristic desired for the signals received by the horns. Thus, when the $A+C$ signal is subtracted from the B signal, the resultant signal is a maxima whenever the position of angular scan of the antenna relative to the targets is such that one of them is intercepted by the axis of the beam. A distinct valley or minima occurs when the beam axis is oriented midway between the targets.

Figure 7:
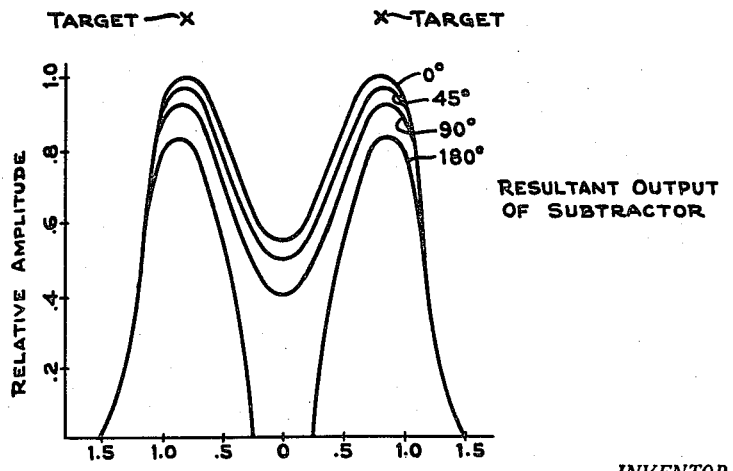

The signal resulting from the subtraction of the $A+C$ signal of horns A and C from the B signal of horn B varies in relative amplitude during the antenna scan as shown in FIGURE 7. Even when the phase of the signal received from the two targets is zero a distinct valley is observed between the two target maxima of only .8 beamwidth spacing. Inasmuch as the zero phase relation of the two echo signals of the targets is the most difficult condition for discrimination, all other signals of random phase relations are more easily resolved. When the echo signals are 180 degrees out of phase with respect to each other, the resolving power of the radar is, of course, maximized.

In FIGURE 1 is shown one embodiment of a system for producing the highly useful results of FIGURE 7. Horn B communicates directly through waveguides 10 and 11 to the output of transmitter 12 which may be triggered on and off by a pulse generator, not shown. The anti-transmit-receive device 13 is inserted in waveguide 11 to prevent the dissipation of received echo signals in the transmitter 12. The received signals, instead, are conducted through the transmit-receive device 14 to the detector 15 where they are combined with the output of local oscillator 16 to produce an intermediate frequency on conductor 17. This intermediate frequency is amplified as desired and detected in the receiver 18. The output of receiver 18 consists of direct current voltage pulses analogous in amplitude to the amplitude of the echo signal received at horn B. Horns A and C are joined at the Y junction 20 and hence are coupled through waveguide 21 and through transmit-receive device 22 to the detector 23. The length of the legs of the Y are carefully adjusted so that the relative phases of the signal portions received by horns A and C, respectively, remain constant and add in waveguide 21. The microwave energy thus received is beat to an immediate frequency by the local oscillator 24. Oscillator 24 may be, and preferably is, common with the local oscillator 16. The intermediate frequency on conductor 25 is amplified and rectified at receiver 26, just as in receiver 18. However, the amplification at 26 of the detected signal may be disproportionate to that of receiver 18 so that the relative amplitudes of the sum or null patterns of FIGURE 6 may be adjusted as desired. By increasing the gain of receiver 26, the center maxima of the $A+C$ signal, FIGURE 6, can be heightened as desired.

Now, the output of receiver 26 is subtracted arithmetically from the output of receiver 18 in any suitable subtracting network 27. The resultant of the subtraction operation is fed to a utilization circuit such as the indicator 28. The indicator may be a cathode ray tube which would produce clear indications of separate targets spaced as close as .8 beam width apart without the appearance of troublesome false targets. Alternatively, the output of subtractor 27 could be employed in the usual manner in fire control systems for locking on the selected target without the danger of the locked-on radar skipping to a nearby target.

What is claimed is:

1. In a radar system, apparatus for increasing angular resolution comprising:
   first means for transmitting a beam of radar signals and for receiving a portion of said signals returned from reflecting objects intercepted by the said beam;
   a second means comprising two horns respectively on two axes of directional sensitivity, each axis being acutely, equiangularly displaced in opposed relation with respect to the axis of the beam transmitted by said first means for receiving other signal portions reflected from the aforesaid intercepted objects, and means additively coupling the said signal portions received by the said two horns into a common channel; and
   means for comparing the energy received by the said first and second means to produce signals representative of the said reflecting objects.

2. In a radar system, apparatus for increasing angular resolution comprising:
   first means for transmitting a beam of radar signals and for receiving a portion of said signals returned from reflecting objects intercepted by said beam;
   a second means including two receiving horns respectively on two axes of directional sensitivity, each axis being acutely, equiangularly displaced in opposed relation with respect to the axis of the beam transmitted by said first means, and means coupling said two receiving horns into a common channel over equal wavelength paths for receiving other signal portions reflected from the aforesaid intercepted objects; and
   means for comparing the energy received by said first and second means to produce signals representative of the reflecting objects.

3. In a single-beam radar system, apparatus for increasing angular resolution comprising:
   a first antenna horn for radiating a beam of radar signals into space and for receiving signal portions returned from reflecting objects intercepted by said beam;
   two receiving antenna horns additively coupled over equal wavelength paths to a common channel, said horns having respectively two axes of direction sensitivity acutely and equiangularly displaced in opposed relation with respect to the axis of the beam transmitted by the first antenna horn for receiving other signal portions reflected from the aforesaid intercepted objects;

a beam-forming reflector disposed fixedly with respect to said antenna horns such that the horns are in close proximity to, and directed toward, said reflector, and the axes of said first antenna horn, said reflector, and said beam coincide; and a subtracting circuit coupled to subtract the energy received by said two receiving horns through said common channel from the energy received by said first antenna horn whereby the energy received by said first antenna horn and two receiving horns is subtracted out leaving the resultant maximum signal of reflecting objects for improved angular resolution of the reflecting objects.

References Cited in the file of this patent

UNITED STATES PATENTS

| | | |
|---|---|---|
| 2,716,235 | Isbister | Aug. 23, 1955 |
| 2,751,586 | Riblet | June 19, 1956 |
| 2,825,900 | Collbohm | Mar. 4, 1958 |

OTHER REFERENCES

"Principles of Radar," MIT Radar School Staff, 2nd ed., pp. 11–3 and 11–4.